United States Patent [19]
DeGroote

[11] 3,734,168
[45] May 22, 1973

[54] WATER OR LIKE BOILER

[75] Inventor: Raymond S. DeGroote, Centerville, Ohio

[73] Assignee: United Aircraft Products, Inc., Dayton, Ohio

[22] Filed: Dec. 3, 1971

[21] Appl. No.: 204,553

[52] U.S. Cl. ...... 165/11, 165/86, 165/105, 122/12, 122/450
[51] Int. Cl. ............................................. F28d 11/00
[58] Field of Search ............... 165/11, 86, 134, 165/105, 1; 122/12, 450

[56] References Cited
UNITED STATES PATENTS

| | | | |
|---|---|---|---|
| 3,004,545 | 10/1961 | Siemer | 165/134 |
| 3,048,373 | 8/1962 | Bauer et al. | 165/1 |

*Primary Examiner*—Charles Sukali
*Attorney*—J. E. Beringer

[57] ABSTRACT

A water boiler type cooling device in which provision is made for continuing operation of the device despite temporary inverted attitude or negative gravity conditions of operation. Continuous venting without loss of liquid is provided for as well as means continuously to present liquid for vaporization at heated surfaces.

7 Claims, 5 Drawing Figures

PATENTED MAY 22 1973 3,734,168

WATER OR LIKE BOILER

BACKGROUND OF THE INVENTION

Devices commonly known as water boilers comprise a tank, a body of water in the tank and heat exchange tubes or the like which dispose within the body of water and connect outside the tank into a circuit flowing a fluid having a heat absorbing function. The body of water acts as a heat sink, the flowing fluid rejecting heat thereto through the walls of the heat exchange tubes. Under pressure-temperature conditions conducive of boiling, substantial amounts of heat energy are absorbed into the water in a vaporization thereof, the absorbed energy being subsequently liberated to the atmosphere as the created vapor is allowed to condense. Venting of created vapor from the tank is required, although venting may be placed under control of a pressure regulating valve, particularly when it is desired to maintain a fluid temperature higher than that which would result from boiling at atmospheric pressure. The water boiler type device as heretofore known does not lend itself to use in an inverted attitude nor under negative gravity conditions. Displacement of the body of liquid away from the heat transfer surface interrupts cooling and the liquid may, moreover, be lost overboard through vent openings. If vents are closed, boiling is suppressed and the fluid temperature may be allowed to rise to undesirably high levels. Devices of the water boiler type accordingly have had little application to aircraft, especially in installations intolerant of even brief periods of no heat dissipation.

SUMMARY OF THE INVENTION

An object of the present invention is to provide a water boiler device capable of functioning effectively in normal use and during limited periods of use in an inverted attitude or under conditions of negative gravity. In an illustrative embodiment the invention provides a closed tank containing a body of liquid leaving a vapor space in an upper part thereof having regard to a normal attitude of use. The tank provides a vapor outlet in its upper part controlled by a valve which opens in the presence of some predetermined high pressure value in the tank interior. A heat exchanger or heat exchanger core disposes in a fixed position in the tank and is connected externally into a system circulating a fluid which in use absorbs heat to be rejected to the body of liquid in the tank. Manifold means in the tank defines a chamber through which the tank interior communicates with the vapor outlet. A gravity responsive valve controls communication of the vapor space in the upper part of the tank with the chamber. A continuously open tube extends from the chamber to the lower part of the tank to communicate with a vapor space created by displacement of the body of liquid to the normal upper part of the tank as caused by an inverting of the tank or by negative gravity. The tank interior accordingly is at all times vented, subject to the pressure limitation imposed by the pressure regulating valve, but no opportunity is offered the contained liquid to be lost overboard. Further in the tank, the heat exchanger or heat exchanger core is surrounded by means forming a liquid reservoir. The reservoir retains liquid at the heat exchanger under inverted attitude and negative gravity conditions for a limited time period irrespective of displacement of the body of liquid.

Other objects and structural details of the invention will appear from the following description, when read in connection with the accompanying drawings, wherein.

Figure 1:
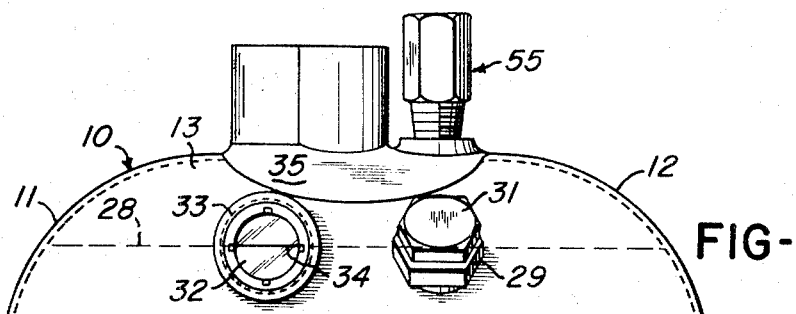
FIG. 1 is a view in side elevation, partly broken away, of a water boiler type device in accordance with the illustrated embodiment of the invention.
Figure 2:
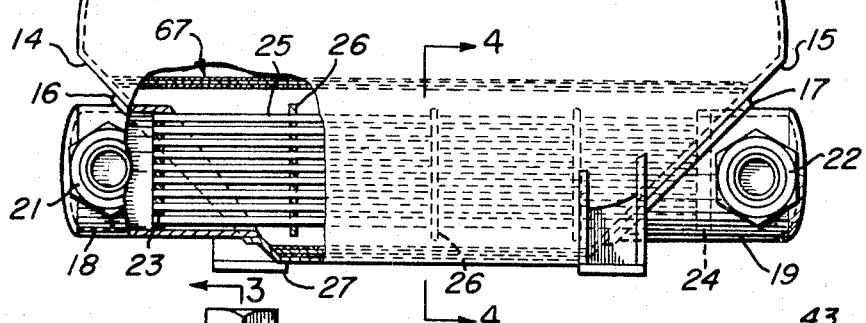
FIG. 2 is an end view, partly broken away, of the device of FIG. 1.
Figure 2:
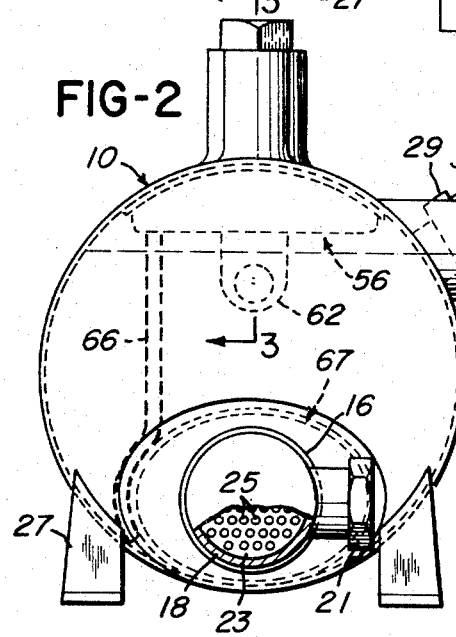
Figure 3:
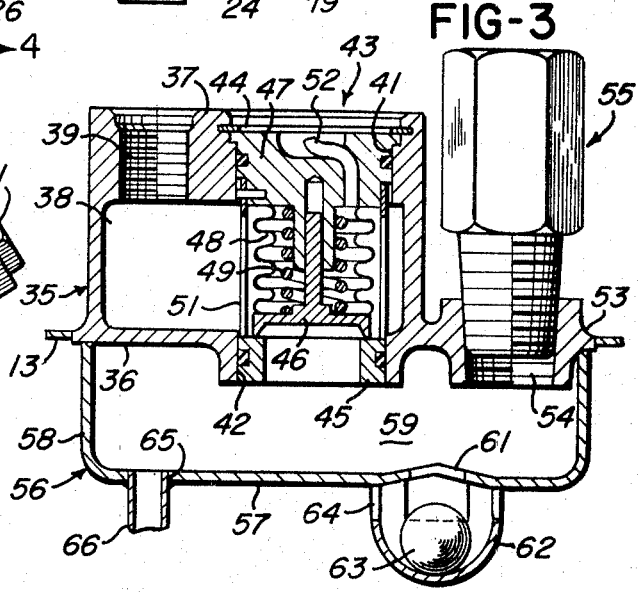
FIG. 3 is a fragmentary view in longitudinal section, taken substantially along the line 3—3 of FIG. 2.
Figure 5:
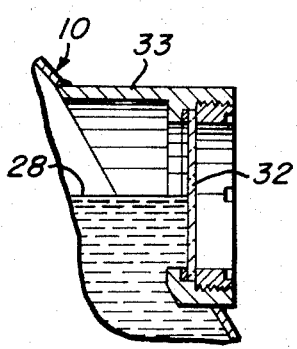
FIG. 5 is a detail sectional view of a sight glass means embodied in the boiler tank.
Figure 4:
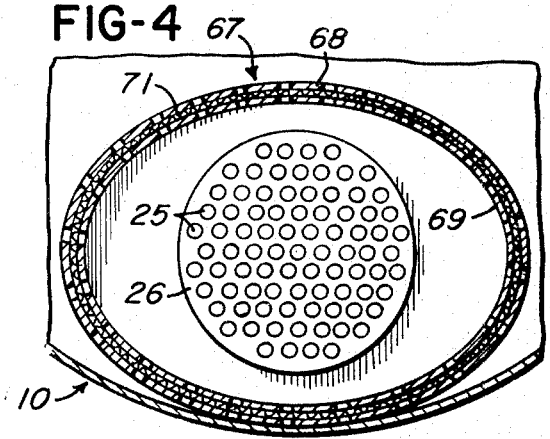
FIG. 4 is a fragmentary view in cross section, taken substantially along the line 4—4 of FIG. 1.

In its illustrated embodiment, the invention provides a generally closed tank 10 which may be conventionally formed to any required configuration, as for example through a use of hemispherical end portions 11 and 12 and a central cylindrical portion 13, all suitably welded or otherwise joined into an integrated structure. The hemispherical end portions 11 and 12 have respective flats 14 and 15 in each of which is positioned a respective flanged plate 16 and 17. Installed in one flanged plate is a manifold 18 and installed in the other flanged plate is a like manifold 19. The manifolds 18 and 19 have a shell-like form and terminate at one end within the tank interior. Intermediate their ends the manifolds are joined, as by brazing or welding, to respective plates 16 and 17 in a manner forming a bond and a seal. The plates are similarly secured in the tank walls. Outside the tank, outer ends of the manifolds have respective fittings 21 and 22 attached thereto serving alternatively as the inlet and outlet for a fluid circulated under conditions by which it is caused to absorb heat.

The open inner ends of the manifolds 18 and 19 receive respective header plates 23 and 24 between which extend a plurality of heat exchange tubes 25. The arrangement places the tubes 25 in parallel closely spaced relation and exposes them to the interior of the tank 10. The headers 23 and 24 are suitably brazed or otherwise joined to the manifolds 19 by means forming a seal and a bond. Tubes 25 similarly are mounted in the headers 23 and 24. The arrangement effectively precludes an interchange of fluids from opposite sides of the respective header plates. As indicated, baffles 26 may be mounted in the bundle of tubes 25 for strengthening and vibration inhibiting purposes.

The tank 10 may be equipped with mounting feet 27. In the tank is a body 28 of a vaporizable liquid, usually water. The liquid, which for convenience will hereinafter be termed water, is admitted to the tank through an inlet fitting 29 installed in an upper wall portion of the tank. Fitting 29 is normally closed by a plug 31. A sight window 32 is mounted in a boss 33 mounted in the tank wall along side fitting 29. A reference line 34 appears on the sight glass 32 and serves as a marker to indicate a "full" water level. As seen, the reference line 34 substantially coincides with the lower lip of the fitting 29. The level of liquid in the tank normally is sufficient fully to submerge the heat exchanger tubes 25 which accordingly are in continuous, intimately contacting relation to water throughout their externally presented surfaces.

Mounted in the top of the tank 10 intermediate its ends is a cast body 35. The body 35 has a lower horizontal wall 36 and an upper horizontal wall 37, the walls being separated by a chamber 38. Laterally offset in the upper wall 37 is a through opening 39. The opening 39 communicates at its one end with chamber 38 and at its other end connects to the atmosphere or to a suitable place of venting, the opening being adapted for connection to discharge conduit means or to receive a plug for shipping or storage purposes. Also in the wall 37 is an opening 41 aligning with a corresponding opening 42 in the lower wall 36. Mounted in to bridge the openings 41 and 42 is a pressure regulating valve assembly 43 held in place by a lock ring 44. The valve assembly 43 is not itself a part of the present invention and so will be only briefly described. It includes a bushing 45 pressed into opening 42 and providing a seat for a valve 46 which when resting upon the bushing 45 cuts off communication between the tank interior and chamber 38 as tends normally to be established through the central aperture in the bushing. In opening 41 is a body 47, a downwardly projecting portion of which provides a sliding bearing for the upwardly projecting stem of valve 46. A bellows 48 extends between body 47 and valve 46. A compression spring 49 within the bellows is based on body 47 and acts on valve 46 to urge it in a direction to seat on bushing 45. A slotted sleeve 51 interconnects bushing 45 and body 47 in surrounding relation to bellows 48 and completes the assembly. The bellows 48 is evacuated to provide a 0 psia reference. A tube 52, subsequently pinched off or closed, provides the means of evacuation. The bellows may be partly filled with a silicone fluid or the like for damping to eliminate the effects of vibration and shock. The effective cross sectional area of the bellows is approximately equal to the sealing diameter of the valve, thereby eliminating the effects of ambient pressure. The spring 49 has a force to maintain valve 46 normally closed and to allow unseating and opening of the valve in the presence of an absolute relief pressure as determined by the desired interior pressurization of the tank.

The lower horizontal wall 36 has an extension 53 in which is a through opening 54. Mounted in the opening 53 is a pressure relief valve assembly 55 which has a safety function. In the event of the tank interior becoming over-pressurized valve 55 opens, and, when the condition causing overpressurization is removed, the valve closes.

Disposing within the tank interior in underlying relation to the cast body 35 is manifold means 56. The means 56 is in the form of a cupped sheet metal housing or the like having a wall 57 disposing below body wall 36. An upstanding wall 58 at the margins of horizontal wall 57 extends upward to limit against body 35 and is suitably attached thereto as by welding or brazing. The manifold housing 56 defines, in conjunction with body 35, a chamber 59 in common communication with the opening controlled by valve 46 and the opening 54 controlled by valve 55. In addition, wall 57 has an opening 61 through which chamber 59 communicates with the tank interior outside the manifold housing. A cage 62 depends from wall 57 below opening 61 and carries a gravity responsive ball 63. The cage opens to the tank interior through apertures 64. Manifold wall 57 still further provides an opening 65. One end of a tube 66 is received in opening 65, the tube 66 extending downward in the tank and terminating at its other end in the lower part of the tank substantially below the bundle of heat exchanger tubes 25. Tube 66 is open and establishes free communication between chamber 59 and what is normally the lower part of the tank interior.

The heat exchanger tube bundle is surrounded by reservoir means 67. The reservoir 67 comprises spaced apart sheet metallic members 68 and 69 between which is a layer 71 of fiber glass cloth. The sheet members 68 and 69 have a perforate or foraminous construction. The arrangement is one to offer no material restriction to a movement of water into the space enclosed by barrier 67 and to allow created vapor to escape freely therefrom. However, should the main body of water in the tank be displaced away from the tube bundle a substantial quantity of water will be trapped by the barrier 67 and will remain in contact with the tubes of the tube bundle for a limited period of time.

In the use of the water boiler, an initial amount of water is added as indicated by the reference line 34. The maximum water level accordingly is below cage apertures 64 and leaves a space in the upper part of the tank for the formation of vapor pressure and which is sufficient also to accommodate freezing and temperature expansion of the water. In a normal attitude of the tank the cast body 35 positions uppermost so that in a normal attitude, and in the presence of positive gravity conditions, ball valve 63 lies in the bottom of cage 62 allowing free communication between the tank interior above the water level and chamber 49 through apertures 64 and opening 61. If the transport fluid which is put through the heat exchanger tubes is not flowing or is not in need of cooling pressure conditions in the upper part of the tank, and therefore in chamber 59, are insufficient to force valve 46 off its seat so that this valve remains closed under the urging of spring 49. As the transport fluid becomes hot and in need of cooling, the water adjacent tubes 25 undergoes a phase change, absorbing substantial amounts of heat from the tube walls and in a vapor form passes through barrier 67 and rises through the contained body of water into the upper part of the tank. Makeup water continuously filters through the barrier 67 to replace that vaporized by the absorbed heat. The vapor pressure in the tank above the water level rises, and, at a predetermined critical pressure value becomes sufficient to force valve 46 off its seat against the urging of spring 49. An escape route for vapor accordingly is established through apertures 64, opening 61, chamber 59, chamber 38 and outlet opening 39. The result is to stabilize the system at the desired pressure-temperature condition and to define a high temperature limit for the circulating transport fluid which is maintained in the normal running of the system.

Should the tank assume an inverted attitude, or should the tank be subjected to negative gravity influences, the body of water 28 displaces to the normal upper part of the tank and creates a vapor space in the normal lower part thereof. This action is accompanied by no appreciable loss of water, however, since the same forces displacing the body of water tend also to move ball valve 63 to a seat on wall 57 closing opening 61. Communication between the chamber 59 and the normal upper part of the tank interior accordingly is cut off. At the same time, tube 66 establishes communication of the chamber 59 with the vapor space created in the normal lower part of the tank. Accordingly, as the system continues to operate and vapors are released from the contained body of liquid these vapors are vented by tube 66 and the system continues to operate under its design temperature-pressure considerations. Also during inverted attitude or negative gravity conditions water is trapped by barrier 67 to maintain a supply thereof in contact with tubes 25 to accomplish the desired boiling effects and thereby cooling of the circulating fluid. It will be understood, in this connection, that barrier 67 is constructed to provide continued cooling over a limited period of time, it being contemplated that the conditions causing inverted attitude or negative gravity will be of short duration. Similarly, the system itself has usually a limited, predetermined useful life, the water being an expendable medium replaced in the tank prior to and in expectation of each period of use.

It will be understood that various modifications may be made in the disclosed structure without departing from the inventive concept. For example, instead of the barrier 67 there might be provided a low density wicking material disposed as a packing around the tubes 25. Design considerations in this respect may at least in part be determined by the time period in which operation is required to be maintained under inverted attitude conditions. Also, the heat exchanger portion of the tank assembly has been disclosed as comprised of a core of tubes. These offer prime surface contact between the circulating heated fluid and the water in the tank and therefore may be considered to offer the most advantageous heat transfer means. However, other forms of heat exchange device may be used, as for example a plate and fin heat exchanger in which the liquid in the tank would fill and occupy vertically disposing passages and contact supplemental or secondary heat transfer surface in the form of strip fin material.

The invention has been disclosed with reference to a particular embodiment. Structural modifications have been discussed and these and others obvious to a person skilled in the art to which the invention relates are considered to be within the intent and scope of the invention.

What is claimed is:

1. A liquid boiler type cooling device, including a closed tank containing a body of vaporizable liquid which in use provides a vapor space in the normally upper part of the tank having regard to a normal attitude of use thereof, a vapor outlet from said tank in the normally upper part thereof, a heat exchanger disposing in a fixed position in the tank and connected for flow of a heated fluid therethrough for cooling by rejecting heat to said liquid, said heat exchanger in a normal tank attitude and under positive gravity conditions being positioned to be submerged by the liquid in said tank, manifold means in said tank defining a chamber through which the tank interior communicates with said vapor outlet, a gravity responsive valve controlling communication of the vapor space in the normally upper part of said tank with said chamber, and a continuously open tube extending from said chamber to the normally lower part of the tank to communicate with a vapor space created therein by displacement of the body of liquid to the normally upper part of the tank as caused by an inverting of the tank or by negative gravity.

2. A cooling device according to claim 1, characterized by means in a substantially surrounding relation to said heat exchanger forming a liquid reservoir retaining liquid at said heat exchanger under inverted attitude and negative gravity conditions for a limited time period irrespective of displacement of the body of liquid.

3. A cooling device according to claim 2, wherein said heat exchanger is comprised of a bundle of tubes mounted in the tank in the normally lower part thereof and opening at its ends through opposed tank walls, the tubes in said bundle being in spaced parallel relation to one another and normally in directly contacting relation to liquid in said body of liquid.

4. A cooling device according to claim 3, wherein said means forming a liquid reservoir comprises perforate wall means installed in a surrounding relation to the tube bundle normally within the contained body of liquid and cloth-like means held between a pair of walls in said perforate wall means whereby to establish a barrier maintaining a supply of liquid at the tube bundle, which barrier is permeable to replacement liquid and to liberated vapor.

5. A cooling device according to claim 1, wherein said gravity responsive valve is a check valve, said manifold means providing an opening through which said chamber communicates with the upper part of the tank interior, said valve seating in to close said opening under inverted or negative gravity conditions.

6. A cooling device according to claim 1, characterized by a pressure regulating valve controlling said vapor outlet, said pressure regulating valve normally blocking vapor flow to and through said vapor outlet and being an absolute pressure relief valve of the damped bellows type providing a valve closing spring pressure yielding a force equal to a selected pressure at which it is desired to open flow through said vapor outlet.

7. A cooling device according to claim 6, wherein said manifold means disposed in a substantially enclosing relation to said vapor outlet and is formed with an opening into the tank interior, said manifold means providing a cage in suspended relation thereto below said opening, said gravity responsive valve having the form of a ball freely movable in said cage.

* * * * *